United States Patent
Goren et al.

(10) Patent No.: US 12,105,671 B1
(45) Date of Patent: Oct. 1, 2024

(54) GLOBAL ACCESS TO FILESYSTEM CONTENT

(71) Applicant: VAST DATA LTD., Tel Aviv (IL)

(72) Inventors: Avi Goren, Tel Aviv (IL); Asaf Levy, Tel Aviv (IL); Renen Hallak, Tel Aviv (IL); Eyal Gordon, Tel Aviv (IL); Yogev Vaknin, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/306,969

(22) Filed: Apr. 25, 2023

(51) Int. Cl.
| | |
|---|---|
| *G06F 16/10* | (2019.01) |
| *G06F 11/30* | (2006.01) |
| *G06F 16/11* | (2019.01) |
| *G06F 16/13* | (2019.01) |

(52) U.S. Cl.
CPC .......... *G06F 16/13* (2019.01); *G06F 11/3075* (2013.01); *G06F 16/122* (2019.01)

(58) Field of Classification Search
CPC ..... G06F 16/13; G06F 16/122; G06F 11/3075
See application file for complete search history.

(56) References Cited

U.S. PATENT DOCUMENTS

| | | | |
|---|---|---|---|
| 10,754,696 B1* | 8/2020 | Chinnam | G06F 11/1453 |
| 2006/0064482 A1* | 3/2006 | Nybo | G06F 16/9574 |
| | | | 709/224 |
| 2009/0094298 A1* | 4/2009 | Bondurant | G06F 3/0649 |
| 2016/0162364 A1* | 6/2016 | Mutha | G06F 3/0608 |
| | | | 707/645 |
| 2018/0373722 A1* | 12/2018 | Ulasen | G06N 3/045 |
| 2022/0197897 A1* | 6/2022 | Bagdis | G06F 16/2379 |

\* cited by examiner

*Primary Examiner* — Mahesh H Dwivedi
(74) *Attorney, Agent, or Firm* — Reches Patents

(57) ABSTRACT

A method for managing access to a shared file system entity (FSE), the method includes (i) managing access requests for reading and writing accessed parts of the FSE, by a current point of access storage system (POASS), the current POASS currently acts as a point of access (POA) for the access requests; wherein stored parts of the FSE are stored at multiple POASSs, the multiple POASSs comprise the current POASS and former POASSs; (ii) determining, by the current POASS and while managing the access requests, to store the stored parts of the FSE at a fewer number of the former POASSs; and (iii) reducing, by two or more of the former POASSs, the number of former POASSs that store the stored parts of the FSE.

18 Claims, 5 Drawing Sheets

GLOBAL ACCESS TO FILESYSTEM CONTENT

BACKGROUND

A global file system is a distributed file system that can be accessed from multiple geographic locations, across a wide-area network, and enables concurrent access to a global namespace that enterprises and branch offices can access from anywhere.

Global file systems generally support multiple copies stored in different locations, or—a core copy may be stored in a cloud storage, while caching is deployed on-premises to provide accelerated data access.

SUMMARY

There may be provided a non-transitory computer readable medium for managing access to a file system entity (FSE), the non-transitory computer readable medium stores instructions for: managing access requests for reading and writing accessed parts of the FSE, by a current point of access storage system (POASS), the current POASS currently acts as a point of access (POA) for the access requests; wherein stored parts of the FSE may be stored at multiple POASSs, the multiple POASSs may include the current POASS and former POASSs;
determining, by the current POASS and while managing the access requests, to store the stored parts of the FSE at a fewer number of the former POASSs; reducing, by two or more of the former POASSs, the number of former POASSs that store the stored parts of the FSE.

There may be provided a method for managing access to a file system entity (FSE), the method may include: managing access requests for reading and writing accessed parts of the FSE, by a current point of access storage system (POASS), the current POASS currently acts as a point of access (POA) for the access requests; wherein stored parts of the FSE may be stored at multiple POASSs, the multiple POASSs may include the current POASS and former POASSs; determining, by the current POASS and while managing the access requests, to store the stored parts of the FSE at a fewer number of the former POASSs; and reducing, by two or more of the former POASSs, the number of former POASSs that store the stored parts of the FSE.

The reducing may be executed following the determining and while the current POASS manages at least some of the access requests.

The involvement of the current POASS in the reducing may be limited to informing at least one of the two or more of the former POASSs about the determining.

The managing of the access requests may include receiving an access request related to a given part of the FSE; determining whether the given part may be stored in the current POASS; when it may be determined that the given part may be stored in the current POASS, responding to the access request by providing the current POASS without accessing any one of the former POASSs; when it may be determined that the given part may be not stored in the current POASS, looking up for the given part in the former POASSs at an order that may be opposite to an order in which the former POASSs were assigned to act as current POASSs.

The method may include monitoring, by the current POASS, access request statistics regarding origins of the access requests; and determining, based on the monitoring, whether to request another storage system to act as a new current POASS for future access requests related to the FSE.

The other storage system may belong to a group of storage systems, the group of storage systems may include the multiple POASSs and additional storage systems.

The FSE may be accessible to a group of storage systems, the group of storage systems may include the multiple POASSs and additional storage systems.

The managing of the access requests may include receiving a request from a storage system of the group to cache at least one part of the accessed parts of the FSE; and determining, by the current POASS, whether to enable the caching.

The determining may be based, at least in part, on statistics regarding POASSs of the multiple of POASSs that store the stored parts of FSE that were read when responding to the access requests.

The former POASSs may include a first former POASS and a second former POASS.

The assignment of the first former POASS preceded an assignment of the second former POASS, wherein the reducing prioritizes migrating parts of the FSE that may be stored in the first former POASS to the second former POASS.

The first former POASS stores less content of the FSE than the second former POASS, wherein the reducing prioritizes migrating parts of the FSE that may be stored in the first former POASS to the second former POASS.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
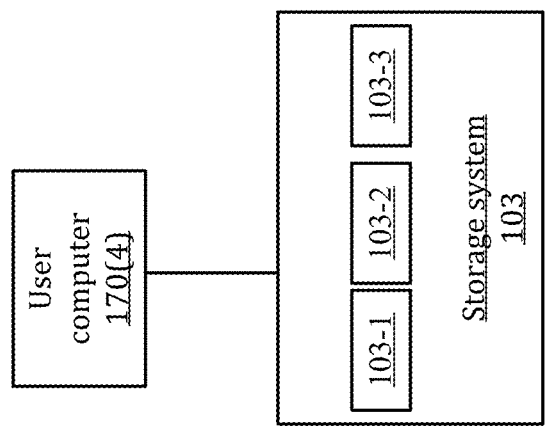
FIG. 1 is an example of storage systems, user computers, and file system entities.
Figure 1:
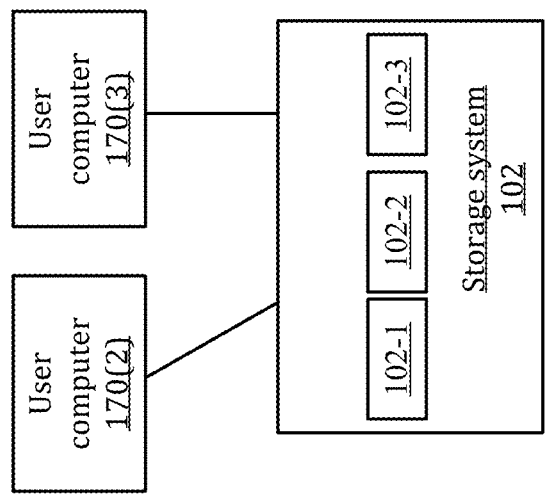
Figure 1:
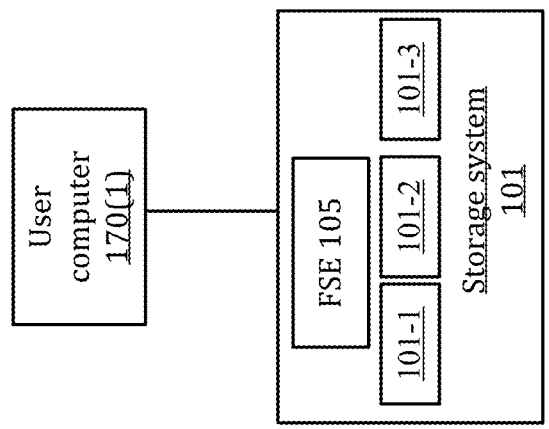

Any reference to "may be" should also refer to "may not be".

In the following detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

The group of storage systems of the present invention enables users to access and update filesystem content that is defined as globally shared content, that is stored in any of the storage systems, and further enables the storage systems to share the content, without managing duplicate copies of the same content that can cause conflicts, and with minimal migration from site to site that is needed sometimes for moving the data closer to the compute resources and to the accessing users.

Specific filesystem entities may be defined as globally accessible by different users connected to different storage systems across the group of storage systems, wherein the accessing users may be connected to storage systems that do not necessarily store the globally accessible FSEs. A globally accessible FSE may be a file, a directory, a filesystem sub-tree, or any entity in a filesystem (File System Entity, FSE). A globally accessible FSE may be identified by a pathname within the hosting filesystem.

For each globally accessible FSE (hereinafter FSE), which can be accessed via multiple storage systems, one of the storage systems serves as a current point of access (POA) of the FSE. The current POASS POA storage system (POASS) acts as a single point for accessing the FSE, regardless of the location (across the group of storage systems) of the FSE. There may be former POASSs that acted previously as current POAs, and these former POASSs former POASS may facilitate the provisioning of at least part of the content.

The former POASS may be, for example, the storage system that created the FSE, or the storage system that stores most of the content of the FSE, or a storage system that may become the former POASS according to determining to assign this role to that storage system, based on any other reason.

FIGS. 1-4 illustrates examples of storage systems, user computers and FSEs.

First storage system 101 includes one or more processing circuits 101-1, one or more storage resources 101-2 and one or more communication units 101-3.

Second storage system 102 includes one or more processing circuits 102-1, one or more storage resources 102-2 and one or more communication units 102-3.

Third storage system 103 includes one or more processing circuits 103-1, one or more storage resources 103-2 and one or more communication units 103-3.

The storage systems may include compute nodes and storage nodes that are in communication with each other via a network. An example of such a storage system is illustrated in U.S. Pat. No. 11,366,700B1 which is incorporated herein by reference.

FIG. 1 illustrates a FSE 105 that was created by first storage system 101 and is currently stored in first storage system 101, which is also referred to as the current POASS of FSE 105.

Other storage systems may receive access requests directed to FSE 105, from users 170 connected to the other systems. In this case, the receiving storage system, e.g., second storage system 102 that receives an access request from a connected user 170(2), requests the requested part of FSE 105 (e.g., offsets of a file indicated in a user request) from the current POASS of FSE 105, i.e., first storage system 101. The requested part of FSE 105 may be cached in the second storage system 102, if permitted by the current POASS. The term 'user' refers to any user computer or user application that is connected to one of the storage systems for accessing FSEs stored in the directly connected storage system or in any other storage system of the group.

Write requests, received by a receiving storage system that is not a current POASS, are handled by requesting a permission to write from first storage system 101, and sending the data to be written to first storage system 101, with or without caching the written data in the receiving storage system 102, but without permanently storing the written data in permanent storage devices of the receiving storage system, to avoid conflicted duplications.

The current POASS, first storage system 101, may track the various origins (accessors) of accesses towards FSE 105, which may include: user computers (e.g., 170(1)) directly coupled to first storage system 101, or other storage systems such as second storage system 102 and third storage system 103 (that forward access requests originated at users connected to the other systems). First storage system 101 may accumulate statistics about the accesses from the various origins, such as frequency and/or bandwidth of write requests, read requests, or both.

Suppose that first storage system 101 detects that most of the write requests are not originated by the users directly coupled to first storage system 101, but rather received from a second storage system, e.g., 102 (probably, in response to requests initiated by users 170(2) or 170(3) connected to second storage system 102). In this case, first storage system 101 may decide to transfer the responsibility for accessing FSE 105 to second storage system 102. Second storage system 102 immediately becomes the current POASS of FSE 105, which means that any access request (read or write) received from users by the other systems, first storage system 101 and third storage system 103, from now on, will be provided via second storage system 102, including:

providing the current data of FSE 105 or part thereof, providing permissions to write new data to be stored in second storage system 102, and providing permissions to temporarily cache data of FSE 105 in the other systems.

First storage system 101 continues to act as a former POA of FSE 105, even after the transfer of the responsibility for accessing a FSE, since most of the content of FSE 105 resides in first storage system 101, and it may take time to migrate the content or may be even not advantageous to migrate the content to the current POASS. According to some embodiments of the present invention, no migration is performed from the former POASS to the current POASS.

Figure 2:
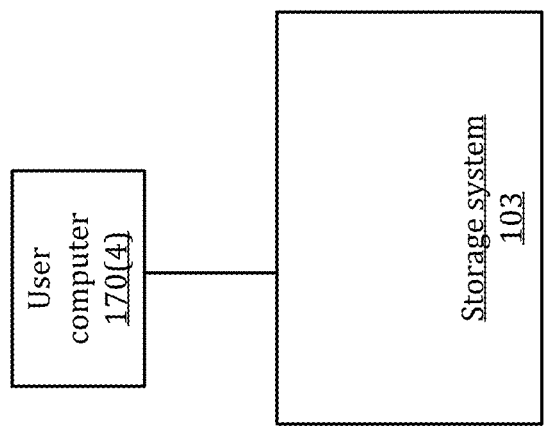
FIG. 2 is an example of storage systems, user computers, and file system entities.
Figure 2:
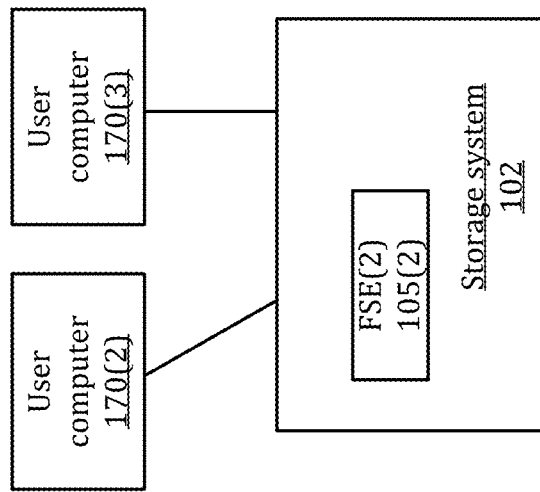
Figure 2:
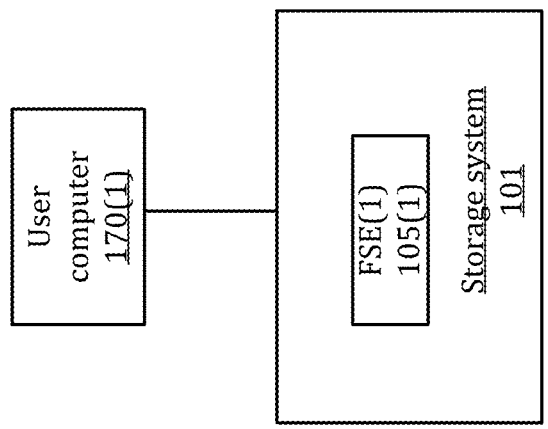

Starting from the time when second storage system 102 becomes the current POASS, when it receives a request, from another storage system, to write data of an FSE that is under its control, e.g., FSE 105, it writes the data into its own storage devices. Data of FSE 105 that was previously written to first storage system 101 continues to be stored in first storage system 101's storage devices. FIG. 2 illustrates a state, subsequent to the event of second storage system 102 becoming the current POASS, where FSE 105 is split between two systems, one part, FSE(1) 105(1) resides in the former POASS, first storage system 101, and another (newer) part resides in the current POASS, second storage system 102.

As for read requests, the requested addresses of FSE 105 may reside either in the former POASS, system 101, or in the current POASS, second storage system 102. When second storage system 102 receives from its directly connected users or from the other storage systems, read requests directed to FSE 105, it checks whether the requested parts (e.g., offsets) of the FSE are stored in its own storage devices. If so—the request is served from the storage devices of second storage system 102, since this content is the newest written content (older versions of the content may reside in the former POASS). If a requested part does not exist in second storage system 102, then the content of the requested part is obtained, by second storage system 102, from the former POASS, first storage system 101.

Later on, second storage system 102 may determine that according to access statistics gathered by second storage system 102, most of the write accesses directed to it, are received from a third storage system 103, and second storage system 102 may decide to hand over to third storage system 103 the responsibility for handling accesses towards FSE 105.

Now the history chain of POAs of FSE 105 are: (i) first storage system 101; (ii) second storage system 102; (iii) third storage system 103, where this order, in which the transferring the responsibility for accessing FSE 105 was performed, also defines the order of relevancy of data, and therefore defines the order of looking up requested data. Therefore, data of requested parts of the FSE is first searched (by third storage system 103) in third storage system 103, for being the most current source of the FSE content. If not found, second storage system 102 is searched for data of the requested parts, and if still not found—first storage system 101 is searched for data of the requested parts. i.e., the order of searching the data is reversed to the order of transferring the role of the current POASS.

Figure 3:
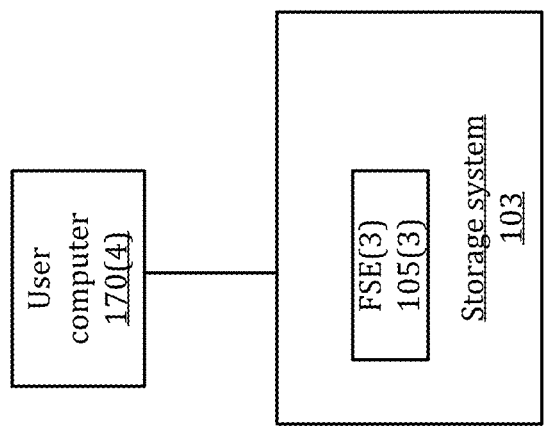
FIG. 3 is an example of storage systems, user computers, and file system entities.
Figure 3:
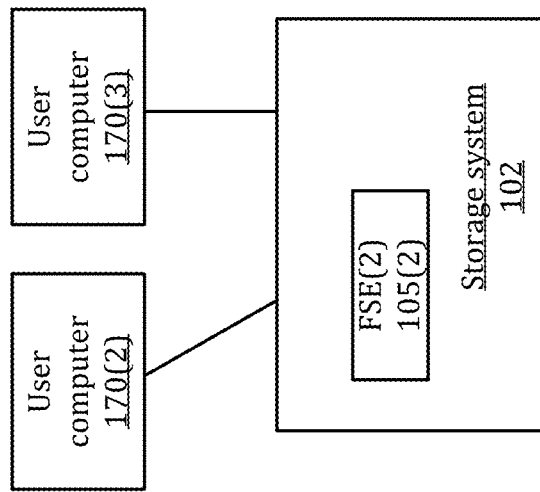
Figure 3:
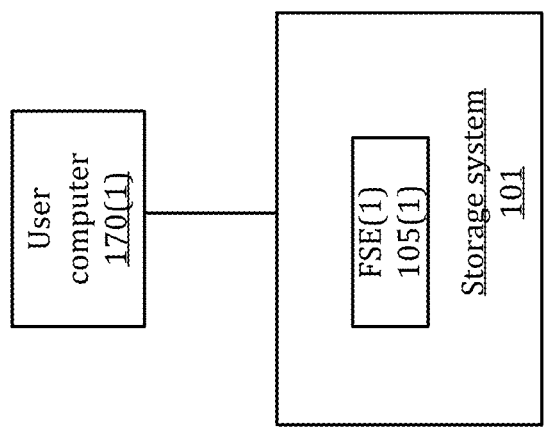

FIG. 3 illustrates a state, subsequent to the event of storage system 103 becoming the current POASS, where FSE 105 is split between three systems, one part, FSE(1) 105(1) resides in first storage system 101, a second part, FSE(2) 105(2) resides in second storage system 102, and a third part FSE(3) 105(3) resides in third storage system 103.

It may be advantageous to reduce the number of hops (number of former POAs for looking up data) required for obtaining the data of requested parts of a requested FSE. For example, it may be decided that data should be found within one hop. i.e., to maintain no more than one former POASS and a current POASS, wherein the current POASS needs only to check for requested data within its own premises or within the premises of the former POASS.

Suppose it is determined to reduce the number of former POASS of the FSE, e.g., when a third storage system, e.g., third storage system 103, receives the responsibility for handling data accesses towards the FSE (which rises the number of former POAs to two), a process for merging the content parts of FSE 105, stored in former POASSs (second storage system 102 and first storage system 101), is initiated, either by the storage system that receives the responsibility for FSE 105, or the system that hands over the responsibility.

It may be determined that the former POASS, that was assigned earlier as a current POA, maintains the role of being a former POASS and that second storage system 102 should become a non POASS, which does not store any part of FSE 105, so that any content of FSE 105 that is stored in second storage system 102, is migrated to first storage system 101.

During the migration process between the second storage system 102 and the former POASS (first storage system 101), the current POASS (third storage system 103) can continue writing new data to FSE 105 within the premises of third storage system 103 itself, without needing to be involved or be interrupted by the migration that is handled by the other storage systems. Therefore, the workload imposed by the migration process is offloaded from the current POASS, to be carried by the former POAs.

When the migration process of FSE 105 is over, the current POASS, storage system 103, is informed about the completion of the migration, and from now on, any content that is not stored in the current POASS is now stored in only one former POASS. Any read request is handled by either responding with content that is stored in storage system 103, or with content that is missed in third storage system 103 and retrieved from the former POASS, e.g., first storage system 101.

Figure 4:
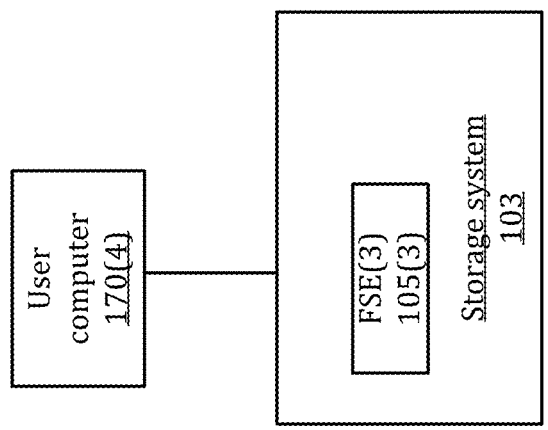
FIG. 4 is an example of storage systems, user computers, and file system entities.
Figure 4:
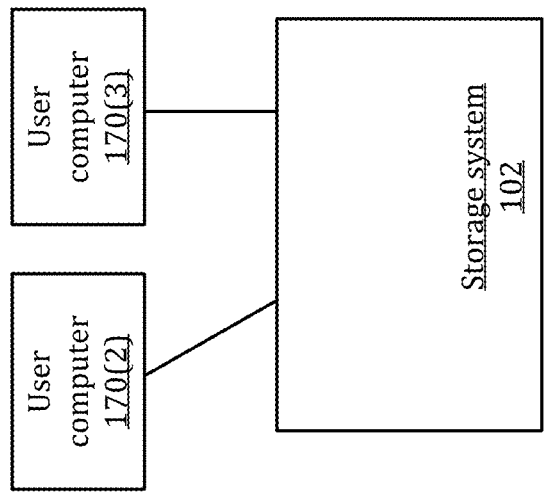
Figure 4:
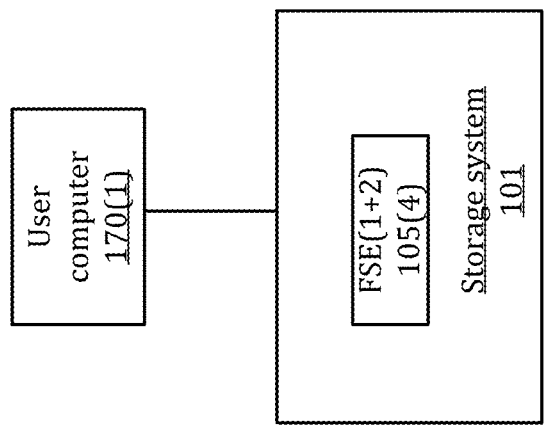

FIG. 4 illustrates a state that is subsequent to the completion of the migration of the portion that was stored in system 102 into first storage system 101. FSE 105 is split between two systems, one part, FSE(1+2) 105(4) resides in first storage system 101, and a second part FSE(3) 105(3) resides in third storage system 103. The part FSE(1+2) 105(4) is a result of the merging of the content of both first and second storage systems 101 and 102, and includes content that previously existed only in first storage system 101, and content that was stored in second storage system 102 and was either added to first storage system 101 or replaced corresponding older content in first storage system 101.

During the migration, and before the migration is completed, the current POASS may need to access more than one other storage system for looking up content of FSE 105, according to the known order of transferring the role of the current POASS, i.e., try to read the content from third storage system 103, then—second storage system 102 and then—from first storage system 101.

According to another embodiment of the invention, instead of determining that the former POASS, that was assigned first, always maintains the role of being the former POASS, the former POASS may be selected as the system that stores most of the content of the FSE. For example, if second storage system 102 stores most of the content of FSE 105, for example, the part FSE(2) 105(2) is larger than the part FSE(1) 105(1), then it may be determined that second storage system 102 is selected as the system that maintains the role of a former POASS. In this case, the direction of the migration is performed from first storage system 101 to second storage system 102.

In this case, during the migration, first storage system 101 sends the content stored in all the offsets of FSE(1) 105(1) to second storage system 102. Second storage system 102 checks whether an offset related to a received content is already associated with content stored in second storage system 102, which is always newer than any content stored in first storage system 101. If so—the older received content is ignored. If no content was written in second storage system 102 for this offset, then the content is written to second storage system 102.

According to another embodiment of the invention, more than two concurrent POAs (one former and a current POA) are allowed to exist, without needing to initiate a migration for reducing the number of POAs. In this case, there is no migration process that needs to be handled between the two former POAs, e.g., first and second storage systems 101 and 102. This may happen when most of the access requests are directed to newest written content, which resides mostly in the current POA, system 103, and in the immediately preceding POA, second storage system 102.

After receiving the responsibility for accessing the FSE, the current POASS may track the read requests towards the FSE, for determining where most of the content is found in response to the read requests. If after a period of tracking the sources of providing requested FSE content, it is found that at least a certain percentage of read requests (e.g., above 75%, 80%, 90% of the read requests) address parts related to content that is found in the current and the immediately preceding POA, then the current POASS may decide not to instruct a migration between the two former POAs. If the current POASS detects that more than a certain part of read requests are addressed to parts that only exist in a POA (e.g., system 101) that is older (was assigned earlier) than the immediately preceding POA (e.g., system 102), then the current POASS may instruct a migration between the two former POAs.

When a storage system requests from the current POASS to read a FSE, the data is provided along with a version of the read part of the FSE, and the requesting storage system may cache the data along with the version. On a subsequent access—the requesting storage system checks the version with the current POASS. The current POASS either confirms the validity of the version, or—sends new data with a new version.

Alternatively, the current POASS may respond to the read request along with an unsolicited permission to cache the data. Upon a change to a relevant part of the FSE, the current POASS either: (i) informs the storage system, that received a permission to cache, about the change, in which case the cache is invalid, (ii) send the new data to the storage system that received a permission. The decision between (i) and (ii)—is based on the intensity of access requests received from the storage system that received a permission to cache, and on the access load on the current POASS.

Figure 5:
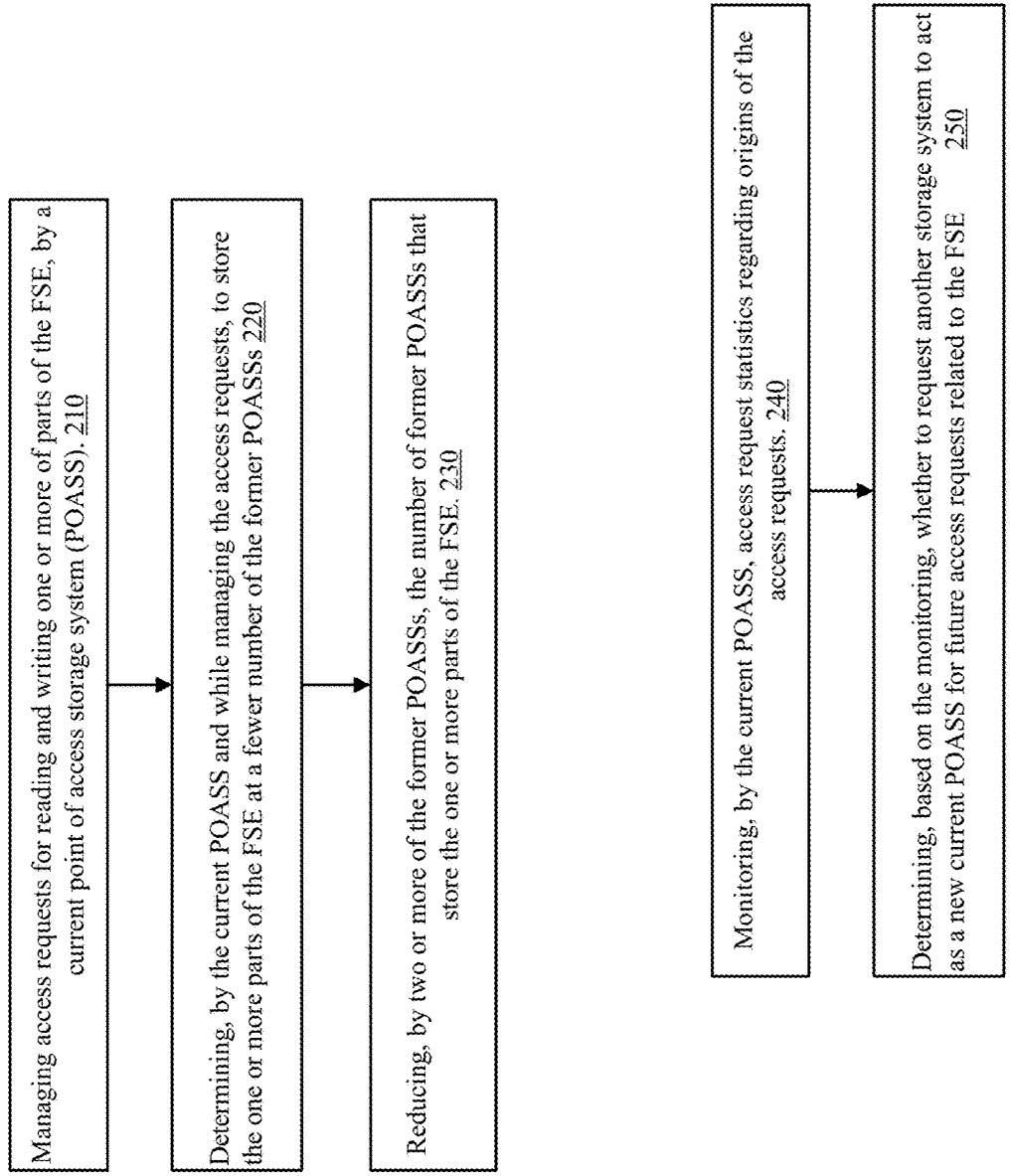
FIG. 5 is an example of a method.

FIG. 5 illustrates an example of method 200 for managing access to a shared file system entity (FSE).

According to an embodiment, method 200 starts by step 210 of managing access requests for reading and writing accessed parts of the FSE, by a current point of access storage system (POASS). The accessed parts are parts specified by the access requests (read and/or write requests) received from users and from other storage systems, and may be specified, for example, by an offset within a file, an address, a length to be accessed, a file within a shared directory, etc.

The current POASS currently acts as a point of access (POA) for the access requests, which may be received from any other storage system or from the users of the current POASS. Acting as a point of access means that any storage system that needs to access a part of the FSE, requests the access to the part from the current POASS, regardless of the location of the requested part. Resolving the location of the requested part is the responsibility of the current POASS, as well as responding to the access request.

Stored parts of the FSE are stored at multiple POASSs. The stored parts may be stored by write requests addressed to the current POASS (these parts are stored in the current POASS) or may be previously stored in response to write requests previously received by former POASSs, when these former POASSs were assigned as the current POASS (these parts are stored in the corresponding former POASS).

The multiple POASSs include the current POASS and former POASSs.

According to an embodiment, step 210 is followed by step 220 of determining, by the current POASS and while managing the access requests, to store the stored parts of the FSE at a fewer number of the former POASSs. The relevant stored parts are those stored at the former POASSs. The fewer number is smaller, by at least one, from the number of the currently defined former POASSs, meaning that at least one former POASS needs to be eliminated, by giving up its role as a former POASS and becoming a non-POASS with respect to the FSE. A former POASS becomes a non-POASS by sending any content of the FSE that is stored within its premises to another former POASS.

According to an embodiment, step 220 is followed by step 230 of reducing, by two or more of the former POASSs, the number of former POASSs that store the stored parts of the FSE. The two or more of the former POASSs are former POASSs that enter a reducing process that may include a migration process for copying parts of the FSE that are stored in one or more former POASSs to a selected former POASS of the two or more of the former POASSs. The FSE parts are sent to the selected former POASS from POASSs of the two or more of the former POASSs, that are not the selected former POASS. The copying of the FSE parts to the selected former POASS may be done by a migration process.

According to an embodiment, the reducing is executed following the determining and while the current POASS manages at least some of the access requests.

According to an embodiment, an involvement of the current POASS in the reducing is limited to informing at least one of the two or more of the former POASSs about the determining. Once the two or more of the former POASSs are informed, the two or more of the former POASSs start the reduction process, where at least one former POASS of the two or more of the former POASSs transfers the relevant stored parts of the FSE stored in the at least one former POASS to at least one other former POASS. The reduction process is handled by the two or more of the former POASSs, without involvement of the current POASS, which can continue with managing access requests, in parallel.

According to an embodiment, step 210 includes:
  a. Receiving an access request related to a given part of the FSE.
  b. Determining whether the given part is stored in the current POASS.

c. When it is determined that the given part is stored in the current POASS, responding to the access request by providing the given part of the FSE by the current POASS without accessing any one of the former POASSs.

d. When it is determined that the given part is not stored in the current POASS, looking up for the given part in the former POASSs at an order that is opposite to an order in which the former POASSs were assigned to act as current POASSs. Note that after the process of reducing is completed, the maximum number of former POASSs that need to be looked up is smaller than the number of former POASSs that need to be looked up during or prior to the process of reducing. For example, referring to FIG. 3, storage system 103, as the current POASSs, needs to access up to three systems for looking up a certain part of the FSE, if this part is stored only in system 101. After the reduction process, storage system 103 needs to access up to two systems for looking up a certain part of the FSE, if it is not stored in system 103. The two systems to be accessed are the current POASS and the former POASS that maintained the role of being a former POASS. No need to access the storage system that gave up its role as a former POASS and became a non-POASS.

According to an embodiment, method 200 includes step 240 of monitoring, by the current POASS, access request statistics regarding origins of the access requests, and further includes step 250 of determining, based on the monitoring, whether to request another storage system to act as a new current POASS for future access requests related to the FSE.

According to an embodiment, the other storage system belongs to a group of storage systems, the group of storage systems includes the multiple POASSs and additional storage systems that are not POASSs of the FSE (either because they were never assigned as current POASSs, or they were POASSs that were eliminated by the step of reducing the number of former POASSs). According to an embodiment the FSE is accessible to a group of storage systems, the group of storage systems includes the multiple POASSs and the additional storage systems.

According to an embodiment, step 210 includes receiving a request from a storage system of the group to cache at least one part of the accessed parts of the FSE; and determining, by the current POASS, whether to enable the caching.

According to an embodiment the determining is based, at least in part, on statistics regarding one or more POASSs of the multiple POASSs that store the stored parts of FSE that were read when responding to the access requests.

According to an embodiment, the former POASSs include a first former POASS and a second former POASS.

According to an embodiment, An assignment of the first former POASS precedes an assignment of the second former POASS, wherein the reducing prioritizes migrating the stored parts of the FSE that are stored in the first former POASS to the second former POASS.

According to an embodiment, the first former POASS stores less content of the FSE than the second former POASS, wherein the reducing prioritizes migrating the stored parts of the FSE that are stored in the first former POASS to the second former POASS.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for managing access to a file system entity (FSE), the method comprises:
    managing access requests for reading and writing accessed parts of the FSE, by a current point of access storage system (POASS), the current POASS currently acts as a point of access (POA) for the access requests; wherein stored parts of the FSE are stored at multiple POASSs, the multiple POASSs comprise the current POASS and former POASSs, wherein the former POASSs previously acted as current POAs;
    determining, by the current POASS and while managing the access requests, to store the stored parts of the FSE at a fewer number of the former POASSs;
    reducing, by two or more of the former POASSs, the number of former POASSs that store the stored parts of the FSE; and
    wherein the managing of the access requests comprises:
    (i) receiving an access request related to a given part of the FSE;
    (ii) determining whether the given part is stored in the current POASS;
    (iii) when it is determined that the given part is stored in the current POASS, responding to the access request by providing the given part from the current POASS without accessing any one of the former POASSs;
    (iv) when it is determined that the given part is not stored in the current POASS, looking up for the given part in the former POASSs at an order that is opposite to an order in which the former POASSs were assigned to act as current POASSs.

2. The method according to claim 1, wherein the reducing is executed following the determining and while the current POASS manages at least some of the access requests.

3. The method according to claim 1, wherein an involvement of the current POASS in the reducing is limited to informing at least one of the two or more of the former POASSs about the determining.

4. The method according to claim 1, wherein the method further comprising:
    monitoring, by the current POASS, access request statistics regarding origins of the access requests; and
    determining, based on the monitoring, whether to request another storage system to act as a new current POASS for future access requests related to the FSE.

5. The method according to claim 4, wherein the other storage system belongs to a group of storage systems, the group of storage systems comprises the multiple POASSs and additional storage systems.

6. The method according to claim 1, wherein the FSE is accessible to a group of storage systems, the group of storage systems comprises the multiple POASSs and additional storage systems.

7. The method according to claim 6, wherein the managing of the access requests comprises receiving a request from a storage system of the group to cache at least one part of the accessed parts of the FSE; and determining, by the current POASS, whether to enable the caching.

8. The method according to claim 1 wherein the determining is based, at least in part, on statistics regarding POASSs of the multiple of POASSs that store the stored parts of FSE that were read when responding to the access requests.

9. The method according to claim 1 wherein the former POASSs comprise a first former POASS and a second former POASS.

10. The method according to claim 9, wherein an assignment of the first former POASS preceded an assignment of the second former POASS, wherein the reducing prioritizes migrating parts of the FSE that are stored in the first former POASS to the second former POASS.

11. The method according to claim 9, wherein the first former POASS stores less content of the FSE than the second former POASS, wherein the reducing prioritizes migrating parts of the FSE that are stored in the first former POASS to the second former POASS.

12. A non-transitory computer readable medium for managing access to a file system entity (FSE), the non-transitory computer readable medium stores instructions for:
    managing access requests for reading and writing accessed parts of the FSE, by a current point of access storage system (POASS), the current POASS currently acts as a point of access (POA) for the access requests; wherein stored parts of the FSE are stored at multiple POASSs, the multiple POASSs comprise the current POASS and former POASSs, wherein the former POASSs previously acted as current POAs;
    determining, by the current POASS and while managing the access requests, to store the stored parts of the FSE at a fewer number of the former POASSs;
    reducing, by two or more of the former POASSs, the number of former POASSs that store the stored parts of the FSE; and
    wherein the managing of the access requests comprises:
    (v) receiving an access request related to a given part of the FSE;
    (vi) determining whether the given part is stored in the current POASS;
    (vii) when it is determined that the given part is stored in the current POASS, responding to the access request by providing the given part from the current POASS without accessing any one of the former POASSs;
    when it is determined that the given part is not stored in the current POASS, looking up for the given part in the former POASSs at an order that is opposite to an order in which the former POASSs were assigned to act as current POASSs.

13. The non-transitory computer readable medium according to claim 12, wherein the reducing is executed following the determining and while the current POASS manages at least some of the access requests.

14. The non-transitory computer readable medium according to claim 12, wherein an involvement of the current POASS in the reducing is limited to informing at least one of the two or more of the former POASSs about the determining.

15. The non-transitory computer readable medium according to claim 12, wherein the non-transitory computer readable medium stores instructions for:
   monitoring, by the current POASS, access request statistics regarding origins of the access requests; and
   determining, based on the monitoring, whether to request another storage system to act as a new current POASS for future access requests related to the FSE.

16. The non-transitory computer readable medium according to claim 15, wherein the other storage system belongs to a group of storage systems, the group of storage systems comprises the multiple POASSs and additional storage systems.

17. The non-transitory computer readable medium according to claim 12, wherein the FSE is accessible to a group of storage systems, the group of storage systems comprises the multiple POASSs and additional storage systems.

18. The non-transitory computer readable medium according to claim 17, wherein the managing of the access requests comprises receiving a request from a storage system of the group to cache at least one part of the accessed parts of the FSE; and determining, by the current POASS, whether to enable the caching.

* * * * *